(12) United States Patent
Deng et al.

(10) Patent No.: US 12,210,245 B2
(45) Date of Patent: Jan. 28, 2025

(54) BACKLIGHT MODULES AND DISPLAY DEVICES

(71) Applicant: TCL CHINA STAR OPTOELECTRONICS TECHNOLOGY CO., LTD., Guangdong (CN)

(72) Inventors: Hongzhao Deng, Guangdong (CN); Jing Liu, Guangdong (CN); Yunfei Dai, Guangdong (CN); Linnan Chen, Guangdong (CN)

(73) Assignee: TCL CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 18/622,893

(22) Filed: Mar. 30, 2024

(65) Prior Publication Data

US 2024/0241406 A1 Jul. 18, 2024

Related U.S. Application Data

(63) Continuation of application No. 18/139,997, filed on Apr. 27, 2023, now Pat. No. 12,001,102.

(30) Foreign Application Priority Data

Dec. 29, 2022 (CN) .......................... 202211713865.3

(51) Int. Cl.
  *G02F 1/1335* (2006.01)
  *G02F 1/13357* (2006.01)
(52) U.S. Cl.
  CPC .. *G02F 1/133612* (2021.01); *G02F 1/133603* (2013.01); *G02F 1/133606* (2013.01); *G02F 1/133608* (2013.01)

(58) Field of Classification Search
  CPC ......... G02F 1/133612; G02F 1/133603; G02F 1/133606; G02F 1/133608
  See application file for complete search history.

(56) References Cited

U.S. PATENT DOCUMENTS

2008/0088769 A1* 4/2008 Kim .................... G02B 6/0068
  349/61
2011/0096265 A1* 4/2011 Murakoshi ........ G02F 1/133605
  349/64

(Continued)

FOREIGN PATENT DOCUMENTS

CN    212229387 U    12/2020
CN    113568220 A    10/2021

(Continued)

OTHER PUBLICATIONS

Chinese Office Action issued in corresponding Chinese Patent Application No. 202211713865.3 dated Nov. 20, 2023, pp. 1-7.

(Continued)

*Primary Examiner* — Evan P Dzierzynski
(74) *Attorney, Agent, or Firm* — PV IP PC; Wei Te Chung (57) ABSTRACT

Disclosed are a backlight module and a display device. The backlight module includes: a driving backplate; and an optical film disposed on a side of the driving backplate light taking-off. The driving backplate includes a substrate, a plurality of electronic elements and an adhesive layer. The plurality of electronic elements are disposed on a side of the substrate close to the optical film, and the adhesive layer is disposed on the plurality of electronic elements. The adhesive layer includes a plurality of first adhesive-dispensed portions arranged at intervals, the plurality of first adhesive-dispensed portions contact and support the optical film. At least one edge of a support region formed by every four adjacent ones of the plurality of first adhesive-dispensed (Continued)

portions is at an angle with a row direction or a column direction of the plurality of electronic elements.

18 Claims, 4 Drawing Sheets

(56) References Cited

U.S. PATENT DOCUMENTS

| | | | | |
|---|---|---|---|---|
| 2020/0089051 A1* | 3/2020 | Watanabe | ......... | G02F 1/133553 |
| 2022/0163849 A1* | 5/2022 | Tien | ................ | H01L 25/0753 |
| 2022/0299823 A1* | 9/2022 | Li | ................. | G02F 1/133611 |
| 2022/0375911 A1* | 11/2022 | Li | ....................... | H01L 25/167 |

FOREIGN PATENT DOCUMENTS

| | | | |
|---|---|---|---|
| CN | 113777825 | A | 12/2021 |
| CN | 114578615 | A | 6/2022 |
| CN | 217467419 | U | 9/2022 |
| TW | 1747710 | B | 11/2021 |

OTHER PUBLICATIONS

Chinese Office Action issued in corresponding Chinese Patent Application No. 202211713865.3 dated Mar. 27, 2024, pp. 1-4.

* cited by examiner

BACKLIGHT MODULES AND DISPLAY DEVICES

CROSS-REFERENCE TO RELATED APPLICATIONS

This application is a continuation application of U.S. application Ser. No. 18/139,997, filed on Apr. 27, 2023, which claims priority to Chinese patent application Ser. No. 202211713865.3, filed on Dec. 29, 2022, the entire disclosures of which are incorporated herein by reference in their entireties.

TECHNICAL FIELD

The present disclosure relates to displays, and in particular, to a backlight module and a display device.

BACKGROUND

Liquid crystal displays (LCD) are different from organic light emitting displays (OLED) due to different display principles. The liquid crystal displays need to use a backlight source to emit light. The backlight source mainly includes a side-type backlight source, i.e., a light emitting diode (LED) as a light source being disposed on a side of a light guide plate, resulting in low light efficiency, high energy consumption, poor uniformity, and low brightness due to the use of the light guide plate to evenly disperse light to every region of a back surface; and a direct-lit backlight source, which lead to increased light uniformity and improved light efficiency using a LED having a uniformly dispersing property.

At present, support columns are generally disposed on a side of a driving backplate close to an optical sheet in a LCD with the direct-lit backlight source, so as to increase a light mixing distance, and weaken grade problems such as Mura (i.e., a phenomenon of various traces due to uneven monitor brightness) and lamp shadow, so that the brightness is more uniform and the grade is better. However, as the requirement for thinning a display device is increased, it becomes more difficult to set up support columns and processing costs increase.

Therefore, there is a need for a backlight module and a display device to solve the above technical problem(s).

SUMMARY

Embodiments of the present disclosure provide a backlight module and a display device, which can solve the problems that it is difficulty to arrange support columns on a side of a driving backplate close to an optical sheet in a direct-lit backlight LCD and the processing cost is high.

An embodiment of the present disclosure provides a backlight module including:
a driving backplate; and
an optical film disposed on a side of the driving backplate light taking-off,
wherein the driving backplate includes a substrate, electronic elements, and an adhesive layer,
the electronic elements are disposed on a side of the substrate close to the optical film, and the adhesive layer covers the electronic elements, and
the adhesive layer includes first adhesive-dispensed portions, the first adhesive-dispensed portions being in contact with the optical film.

An embodiment of the present disclosure further provides a display device including the backlight module as described above and a display panel on a side of the backlight module light taking-off. The backlight module includes:
a driving backplate; and
an optical film disposed on a side of the driving backplate light taking-off,
wherein the driving backplate includes a substrate, electronic elements, and an adhesive layer,
the electronic elements are disposed on a side of the substrate close to the optical film, and the adhesive layer covers the electronic elements, and
the adhesive layer includes first adhesive-dispensed portions, the first adhesive-dispensed portions being in contact with the optical film.

BRIEF DESCRIPTION OF THE DRAWINGS

In order to illustrate the embodiments of the present disclosure, the accompanying drawings to be used in the description of the embodiments will be described briefly below. It is apparent that the accompanying drawings to be used in the description below are only some of the embodiments of the present disclosure, and other drawings may be obtained based on these drawings by those skilled in the art without involving any inventive effort.

DETAILED DESCRIPTION

The embodiments of the present disclosure will now be described with reference to the accompanying drawings. It is apparent that the described embodiments are only a part of embodiments of the present disclosure, rather than all the embodiments. Based on the embodiments of the present disclosure, all other embodiments obtained by a person skilled in the art without involving any inventive effort are within the scope of the present disclosure. In addition, it is to be understood that the embodiments described herein are merely illustrative and explanatory, and are not intended to limit the present disclosure. In the present disclosure, terms indicating orientations or position relationships, such as "top", "bottom", "inside", "outside", or the like, are based on orientations or position relationships illustrated in the drawings, rather than indicate or imply that the devices or elements referred to herein are required to have specific orientations or be constructed or operate in the specific orientations, unless otherwise specifically defined.

Currently, with the increased requirement for thinning a direct-lit backlight LCD, there is problems that it is difficult to set up support columns on a side of a driving backplate close to an optical film, and the processing cost is increased.

Referring to FIGS. 1-7, an embodiment of the present disclosure provides a backlight module 100 including:

a driving backplate 101; and an optical film 102 on a side of the driving backplate 101 light taking-offckplate.

The driving backplate 101 includes a substrate 103, a plurality of electronic elements 104, and an adhesive layer 105.

The electronic elements 104 are disposed on a side of the substrate 103 close to the optical film 102, and the adhesive layer 105 covers the electronic elements 104.

The adhesive layer 105 includes a plurality of first adhesive-dispensed portions 106, which are is in contact with the optical film 102.

According to the present disclosure, when the driving backlight 101 is applied to the backlight module 100, the first adhesive-dispensed portions 106 in the driving backlight 101 replace supporting columns to support the substrate 103 and the optical film 102, thereby thinning the backlight module 100 while simplifying the manufacturing process and saving the processing cost.

The adhesive layer is disposed on the plurality of electronic elements, the adhesive layer comprises a plurality of first adhesive-dispensed portions arranged at intervals, the plurality of first adhesive-dispensed portions contact and support the optical film, and at least one edge of a support region formed by every four adjacent ones of the plurality of first adhesive-dispensed portions is at an angle with a row direction or a column direction of the plurality of electronic elements. Referring to FIGS. 4 to 7, in an embodiment of the present disclosure, the adhesive layer 105 includes one or more support regions 107. Each of the support regions 107 is in a polygon shape, and each of the first adhesive-dispensed portions 106 is disposed at a vertex of the polygon of the support region 107. That is, the support region 107 is formed by a plurality of adjacent ones of the first adhesive-dispensed portions 106. The polygon of the support region 107 is a virtual pattern formed by connecting a plurality of adjacent ones of the first adhesive-dispensed portions 106.

The polygon of the support region 107 may be a triangle, a quadrangle, a pentagon, a hexagon, or the like. By setting the support region 107, the first adhesive-dispensed portions 106 can be used to replace the support columns, so that the manufacturing process of the support columns can be omitted, and the thickness of the backlight module 100 to which the driving backplate 101 is applied is reduced, thereby simplifying the process and saving the processing cost.

Figure 3:
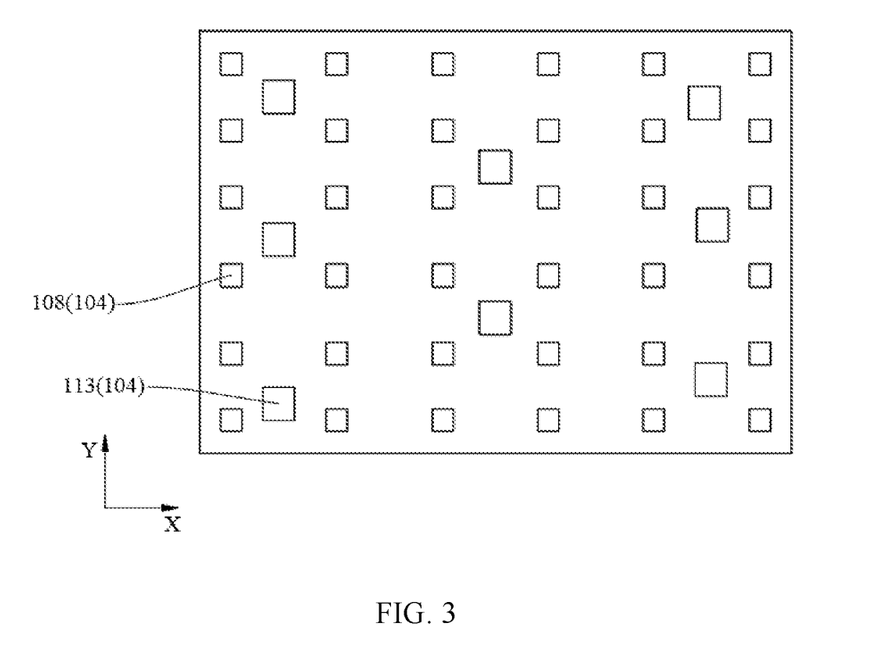
FIG. 3 is a schematic layout diagram of electronic elements according to an embodiment of the present disclosure.

Referring to FIG. 3, in some embodiments, the electronic elements 104 include first electronic elements 108. The first electronic elements 108 are arranged in an array on the substrate 103. That is, the first electronic elements 108 are successively arranged in a row direction X and in a column direction Y. The spacing between any two of the first electronic elements 108 arranged in an array includes, but is not limited to, 2 mm, 4 mm, and the like.

The first electronic elements 108 may be light emitting diodes (LEDs), such as Mini-LEDs.

In some embodiments, the support regions 107 are arranged in the row direction X of the first electronic elements 108. Alternatively, the support regions 107 are arranged in the column direction Y of the first electronic elements 108. Alternatively, the support regions 107 are arranged in the row direction X and the column direction Y of the first electronic elements 108. That is, the support regions 107 are arranged in an array on the substrate 103.

By arranging the one or more support regions 107 in the row direction X and/or the column direction Y of the first electronic elements 108, it can facilitate uniform distribution of the one or more support regions 107 on the substrate 103, and further contribute to uniform support of the support regions 107 between the substrate 103 and the optical film 102 when the driving backplate 101 is applied to the backlight module 100, thereby improving the product quality of the display device.

In some embodiments, all, part or none of the first adhesive-dispensed portions 106 in the same row may be equally spaced from each other along the row direction X of the first electronic elements 108. All, part or none of the first adhesive-dispensed portions 106 in the same column may be equally spaced from each other along the column direction Y of the first electronic elements 108. A spacing between adjacent two of the first adhesive-dispensed portions 106 in the row direction X may be the same as or different from a spacing between adjacent two of the first adhesive-dispensed portions 106 in the column direction Y.

Figure 4:
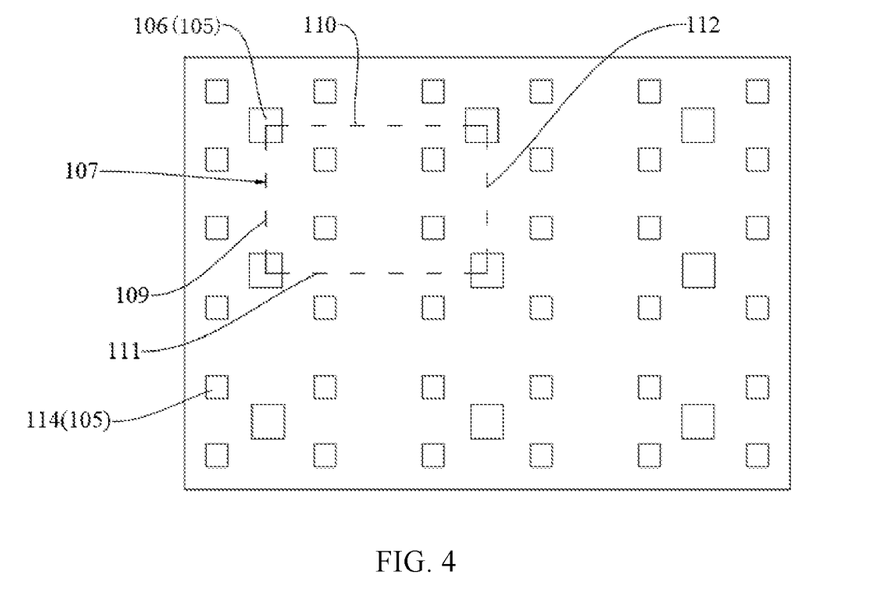
FIG. 4 is a schematic diagram of a first arrangement of an adhesive layer according to an embodiment of the present disclosure.
Figure 5:
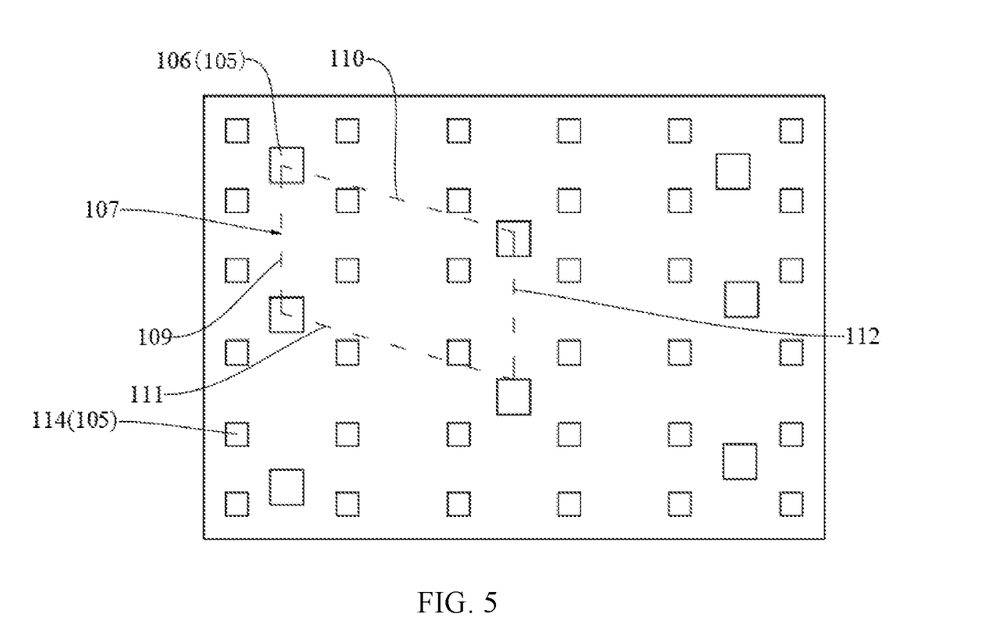
FIG. 5 is a schematic diagram of a second arrangement of an adhesive layer according to an embodiment of the present disclosure.
Figure 6:
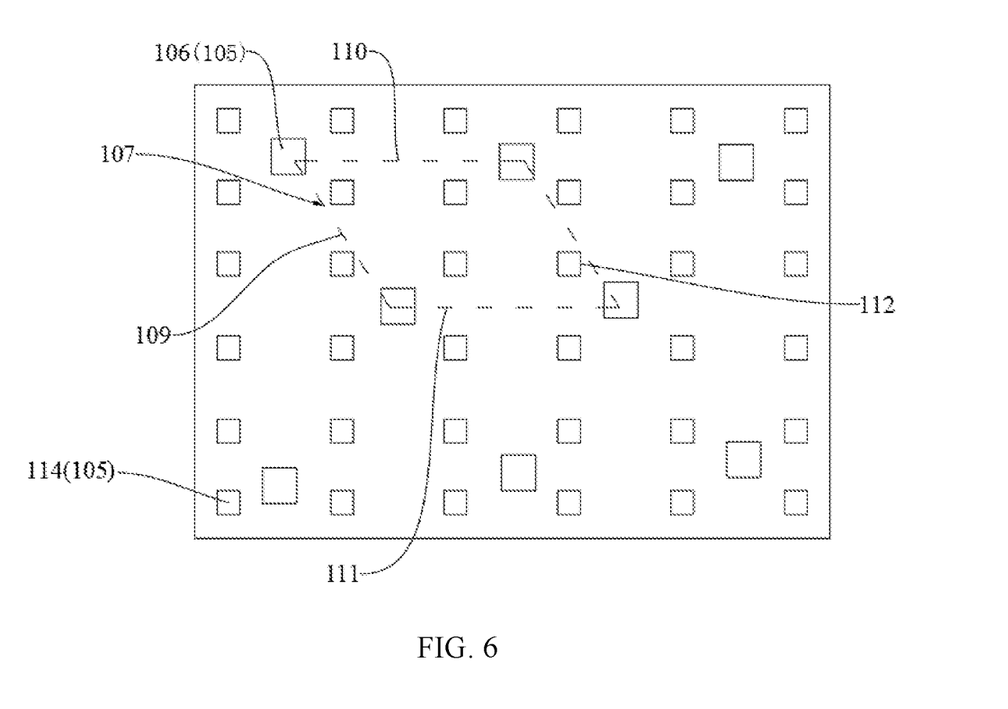
FIG. 6 is a schematic diagram of a third arrangement of an adhesive layer according to an embodiment of the present disclosure.

Referring to FIGS. 4-6, in some embodiments, the polygon of the support region 107 includes a first edge 109 and a second edge 110 adjacent to the first edge 109. The first edge 109 extends in a direction parallel to the column direction Y of the first electronic elements 108. Alternatively, the second edge 110 extends in a direction parallel to the row direction X of the first electronic elements 108. Alternatively, the first edge 109 extends in a direction parallel to the column direction Y of the first electronic elements 108, and the second edge 110 extends in a direction parallel to the row direction X of the first electronic elements 108.

The first edge 109 is perpendicular, or not perpendicular to the second edge 110. In the case that the first edge 109 is perpendicular to the second edge 110, an extension direction of the first edge 109 is parallel to the column direction Y of the first electronic elements 108, and an extension direction of the second edge 110 is parallel to the row direction X of the first electronic elements 108. In the case that the first edge 109 is not perpendicular to the second edge 110, the extension direction of the first edge 109 is parallel to the column direction Y of the first electronic elements 108, or the extension direction of the second edge 110 is parallel to the row direction X of the first electronic elements 108. By setting the extension direction of the first edge 109 to be parallel to the column direction Y of the first electronic elements 108, or setting the extension direction of the second edge 110 to be parallel to the row direction X of the first electronic elements 108, the polygon of the support region 107 at least has a side that is not parallel to the row direction X of the first electronic elements 108 or a side that is not parallel to the column direction Y of the first electronic elements 108, thereby facilitating to reduce the Mura in the row direction X or the column direction Y, and improving the product quality of the display device to which the driving backplate 101 is applied.

In some embodiments, the polygon of the support region 107 further includes a third edge 111 and a fourth edge 112. The third edge 111 and the second edge 110 are opposite to each other and are at two ends of the first edge 109, respectively. The fourth edge 112 connects the second edge 110 and the third edge 111. The extension direction of the first edge 109 is parallel to an extension direction of the fourth edge 112, and the extension direction of the second edge 110 is parallel to an extension direction of the third edge 111.

In the case that the first edge 109 is perpendicular to the second edge 110, the third edge 111 is perpendicular to the fourth edge 112, and the polygon of the support region 107 is a square or a rectangle.

In the case that the first edge 109 is not perpendicular to the second edge 110, the third edge 111 is not perpendicular to the fourth edge 112, and the polygon of the support region 107 is a parallelogram.

When the polygon of the support region 107 is a square or a rectangle, the extension directions of the first edge 109 and the fourth edge 112 are parallel to the column direction Y of the first electronic elements 108, and the extension directions of the second edge 110 and the third edge 111 are parallel to the row direction X of the first electronic elements 108.

When the polygon of the support region 107 is a parallelogram, the extension directions of the first edge 109 and the fourth edge 112 are parallel to the column direction Y of the first electronic elements 108, and the extension directions of the second edge 110 and the third edge 111 are not parallel to the row direction X of the first electronic elements 108. Alternatively, the extension directions of the first edge 109 and the fourth edge 112 are not parallel to the column direction Y of the first electronic elements 108, and the extension directions of the second edge 110 and the third edge 111 are parallel to the row direction X of the first electronic elements 108. When the polygon of the support region 107 is a parallelogram, at least two sides of the polygon are not parallel to the row direction X of the first electronic elements 108 or the column direction Y of the first electronic elements 108, thereby facilitating to reduce the Mura in the row direction X or the column direction Y, and improving the product quality of the display device to which the driving backplate 101 is applied.

Figure 7:
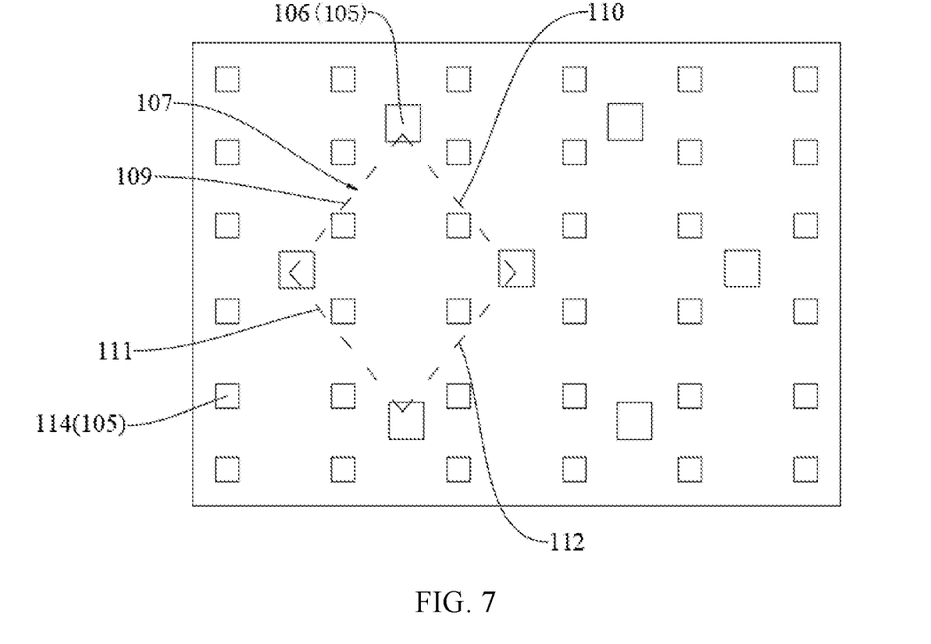
FIG. 7 is a schematic diagram of a fourth arrangement of an adhesive layer according to an embodiment of the present disclosure.

Referring to FIG. 7, in some embodiments, the polygon of the support region 107 includes a first diagonal and a second diagonal intersecting with the first diagonal. The first diagonal extends in a direction parallel to the row direction X of the first electronic elements 108, and/or the second diagonal extends in a direction parallel to the column direction Y of the first electronic elements 108.

When the first diagonal is perpendicular to the second diagonal, the polygon of the support region 107 may be a diamond shape. In this case, the sides of the polygon of the support region 107 are not parallel to both the row direction X and the column direction Y of the first electronic elements 108, thereby facilitating to reduce the Mura in the row direction X and the column direction Y, and improving the product quality of the display device to which the driving backplate 101 is applied.

In some embodiments, the number of the support regions 107 in the same row may be from 3 to 150 in the row direction X of the first electronic elements 108. The number of the support regions 107 in the same column may be from 3 to 100 in the column direction Y of the first electronic elements 108. By this arrangement, it facilitates reasonable and uniform distribution of the support regions 107 on the substrate 103, and further facilitates uniform support of the support regions 107 between the substrate 103 and the optical film 102 when the driving backplate 101 is applied to the backlight module 100, thereby improving the product quality of the display device.

In some embodiments, adjacent support regions 107 may share one or more same vertexes. In an embodiment, adjacent two of the support regions 107 may share the same one of the first adhesive-dispensed portions 106. In another embodiment, adjacent two of the support regions 107 may share the same edge of the polygons of the support regions 107, i.e., two adjacent support regions 107 may share two of the first adhesive-dispensed portions 106.

In some embodiments, the electronic elements 104 further include second electronic elements 113 spaced from each other. Each of the second electronic elements 113 is disposed between any two of the first electronic elements 108.

The second electronic elements 113 may be driving devices, such as driving chips, resistors, capacitors, buffers, or the like.

Figure 1:
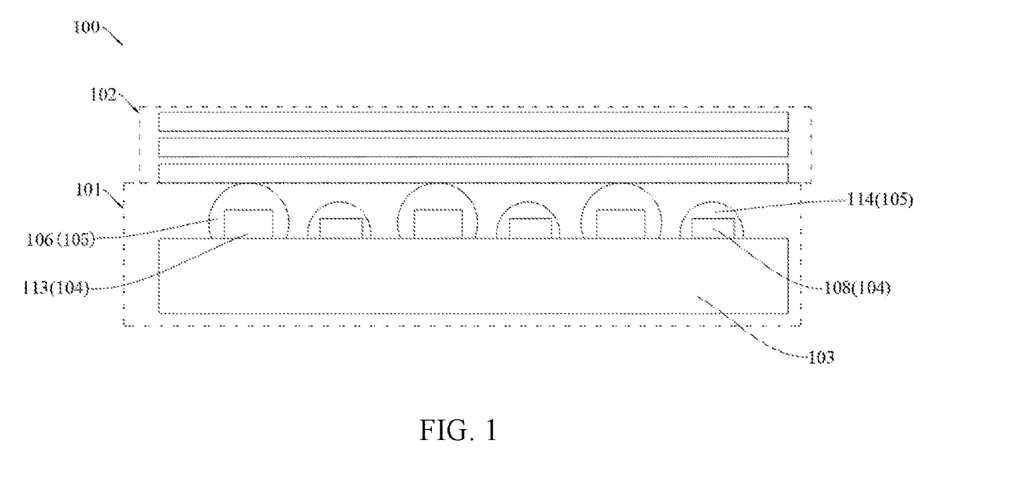
FIG. 1 is a schematic diagram of a first structure of a backlight module according to an embodiment of the present disclosure.
Figure 2:
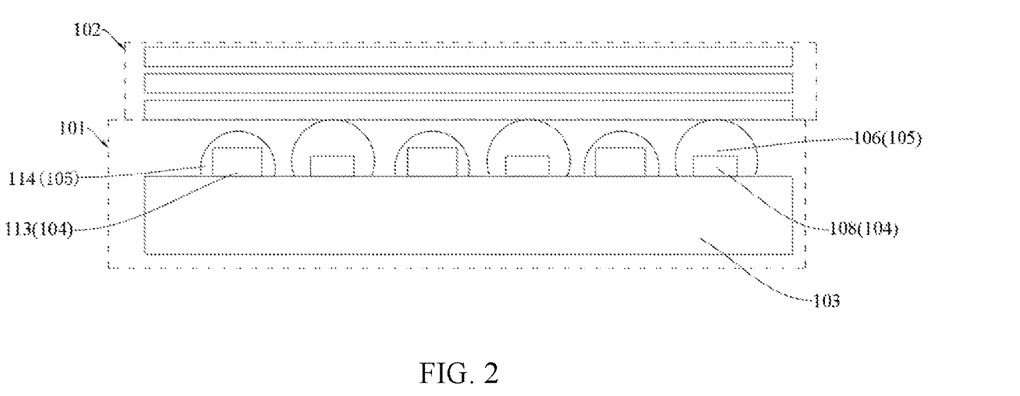
FIG. 2 is a schematic diagram of a second structure of a backlight module according to an embodiment of the present disclosure.

Referring to FIGS. 1 and 2, in some embodiments, the first adhesive-dispensed portions 106 cover at least part of the first electronic elements 108. Alternatively, the first adhesive-dispensed portions 106 cover at least part of the second electronic elements 113. Alternatively, the first adhesive-dispensed portions 106 cover at least part of the first electronic elements 108 and at least part of the second electronic elements 113.

The dispensing layer 105 may further include second adhesive-dispensing portions 114. The first adhesive-dispensed portions 106 and the second adhesive-dispensed portions 114 are bonded to the substrate 103 and configured to encapsulate the electronic elements 104. When the first adhesive-dispensed portions 106 cover at least part of the first electronic elements 108, and/or the first adhesive-dispensed portions 106 cover at least part of the second electronic elements 113, the first adhesive-dispensed portions 106 cover at least one of the first electronic elements 108, and the second adhesive-dispensed portions 114 may cover the remaining electronic elements 104, such as the first electronic elements 108 and the second electronic elements 113 not covered by the first adhesive-dispensed portions 106.

When a volume of each of the second electronic elements 113 is larger than a volume of each of the first electronic elements 108, the first adhesive-dispensed portions 106 preferably cover at least part of the second electronic elements 113. When the volume of each of the second electronic elements 113 is less than the volume of each of the first electronic elements 108, the first adhesive-dispensed portions 106 preferably cover at least part of the first electronic elements 108. By this arrangement, it can facilitate the encapsulation function of the first adhesive-dispensed portions 106, while saving materials and reducing costs.

In some embodiments, a thickness of the second adhesive-dispensed portions 114 is less than a thickness of the first adhesive-dispensed portions 106.

When the first adhesive-dispensed portions 106 are in contact with the optical film 102, the first adhesive-dispensed portions 106 replace the support columns to support the substrate 103 and the optical film 102. The first adhesive-dispensed portions 106 are in a compression deformation state. The second adhesive-dispensed portions 114 are not in contact with the optical film 102.

In some embodiments, a reflective layer is disposed on a side of the substrate 103 adjacent to the electronic elements 104. The first adhesive-dispensed portions 106 include first adhesive-dispensed sub-portions covering at least part of the second electronic elements 113. The first adhesive-dispensed sub-portions cover at least one of the second electronic elements 113. An orthographic projection of the first adhesive-dispensed sub-portions on the substrate 103 covers an orthographic projection of at least part of the second electronic elements 113 on the substrate 103.

A reflectivity of the first adhesive-dispensed sub-portions is greater than or equal to 70% and less than or equal to 90% of a reflectivity of the reflective layer. For example, the reflectivity of the first adhesive-dispensed sub-portions is 75%, 80%, 85%, and the like of the reflectivity of the reflective layer. By setting the reflectivity of the first adhesive-dispensed sub-portions to be greater than or equal to 70% and less than or equal to 90% of the reflectivity of the reflective layer, it can reduce the influence of the Mura and improve the product quality of the display device to which the driving backplate 101 is applied. For example, when the reflectivity of the first adhesive-dispensed sub-portions is 80% of the reflectivity of the reflective layer, the improvement of the Mura is optimal.

A material of the reflective layer may be white ink or other white reflective materials.

In some embodiments, a material of the first adhesive-dispensed portions 106 and a material of the second adhesive-dispensed portions 114 may include epoxy resin or silicone resin. The materials of the first adhesive-dispensed portions 106 and the second adhesive-dispensed portions 114 may be transparent. Alternatively, when the first adhesive-dispensed portions 106 include the first glue adhesive-dispensed sub-portions, the material of the first adhesive-dispensed sub-portions may be white glue. When the material of the first adhesive-dispensed sub-portions is white glue, the material of the first adhesive-dispensed sub-portions may include epoxy resin and titanium dioxide. Alternatively, the material of the first adhesive-dispensed sub-portions may include silicone resin and titanium dioxide.

When the material of the first adhesive-dispensed sub-portions is white glue, a mass fraction of titanium dioxide contained in the first adhesive-dispensed sub-portions is greater than or equal to 30%, and less than or equal to 45% of the total mass of the first adhesive-dispensed sub-portions. For example, the mass fraction of titanium dioxide contained in the first adhesive-dispensed sub-portions may be 32%, 34%, 35%, 36%, 38%, 40%, 42%, and the like. When the mass fraction of titanium dioxide contained in the first adhesive-dispensed sub-portions is greater than or equal to 30%, and less than or equal to 45% of the total mass of the first adhesive-dispensed sub-portions, it can allow the reflectivity of the first adhesive-dispensed sub-portions to be greater than or equal to 70%, and less than or equal to 90% of the reflectivity of the reflective layer, thereby reducing the influence of the Mura and improving the product quality of the display device to which the driving backplate 101 is applied.

When the material of the first adhesive-dispensed portions 106 includes epoxy resin or silicone resin, and the first adhesive-dispensed portions 106 replace the support columns, it can prevent the optical film 102, in contact with the first adhesive-dispensed portions 106, of the backlight module 100 from scratching, thereby improving the product quality of the display device.

In the above embodiments, each of the first adhesive-dispensed portions 106 includes a first surface in contact with the substrate 103. A ratio of the thickness of the first adhesive-dispensed portions 106 to the maximum width of the first surface is greater than or equal to 1:1, and less than or equal to 4:1. For example, the ratio of the thickness of the first adhesive-dispensed portions 106 to the maximum width of the first surface may be 1.5:1, 2:1, 2.5:1, 3:1, 3.5:1, or the like. When the ratio of the thickness of the first adhesive-dispensed portions 106 to the maximum width of the first surface is greater than or equal to 1:1, and less than or equal to 4:1, it can reduce the influence of the Mura, and improve the product quality of the display device to which the driving backplate 101 is applied. For example, when the ratio of the thickness of the first adhesive-dispensed portions 106 to the maximum width of the first surface is 3:1, the improvement of the Mura is optimal.

Each of the second adhesive-dispensed portions 114 includes a second surface in contact with the substrate 103. The first adhesive-dispensed portions 106 and the second adhesive-dispensed portions 114 may be hemispherical, ellipsoidal, cylindrical, elliptical cylinder, cubic, cuboid, or otherwise three-dimensional in shape. When the first adhesive-dispensed portions 106 and the second adhesive-dispensed portions 114 are hemispherical or cylindrical, an orthographic projection of the first surface on the plane in which the substrate 103 is located is a first circle. The maximum width of the first surface is a diameter of the first circle. An orthographic projection of the second surface on the plane in which the substrate 103 is located is a second circle. The maximum width of the second surface is a diameter of the second circle. When the first adhesive-dispensed portions 106 and the second adhesive-dispensed portions 114 are the ellipsoidal shape or elliptical cylinder, the orthographic projection of the first surface on the plane in which the substrate 103 is located is a first oval shape, the maximum width of the first surface is the length of the long axis of the first oval shape. The orthographic projection of the second surface on the plane in which the substrate 103 is located is a second oval shape, and the maximum width of the second surface is the length of the long axis of the second oval shape.

In the above embodiments, the maximum width of the first surfaces of the first adhesive-dispensed portions 106 may be 2 mm to 3 mm, the maximum width of the second surfaces of the second adhesive-dispensed portions 114 may be 2 mm to 3 mm, and the thickness of the first adhesive-dispensed portions 106 and the second adhesive-dispensed portions 114 may be 0.6 mm to 12 mm, respectively. Exemplarily, the thickness of the first adhesive-dispensed portions 106 may be 2 mm to 12 mm, the thickness of the second adhesive-dispensed portions 114 may be 0.6 mm to 1 mm. For example, the thickness of the first adhesive-dispensed portions 106 may be 4 mm, 6 mm, 9 mm, or the like, and the thickness of the second adhesive-dispensed portions 114 may be 0.7 mm, 0.8 mm, 0.9 mm, or the like.

In the above embodiments, a distribution area of the first adhesive-dispensed portions 106 and the second adhesive-dispensed portions 114 is greater than or equal to 20% and less than or equal to 85% of the area of the substrate 103. For example, the distribution area of the first adhesive-dispensed portions 106 and the second adhesive-dispensed portions 114 may be 30%, 40%, 45%, 50%, 60%, 70%, 80%, or the like of the area of the substrate 103. That is, a ratio of the sum of an area of an orthographic projection of the first surfaces of the first adhesive-dispensed portions 106 on the plane in which the substrate 103 is located and an area of an orthographic projection of the second surfaces of the second adhesive-dispensed portions 114 on the plane in which the substrate 103 is located, to an area of an orthographic projection of the third surface of the substrate 103 close to the electric elements 104 on the plane in which the electronic element 104 is located, is greater than or equal to 20% and less than or equal to 85%.

In the above embodiments, the driving backplate 101 has a driving mode including Active Matrix (AM), Passive Matrix (PM), and Micro Integrated Circuit Chip (Micro IC)

driving. The Active Matrix driving is also referred to as active addressing, proactive addressing, active driving, or the like. The Passive Matrix driving is also referred to as passive addressing, passive driving, or the like. The driving backplate 101 has a dimension including but not limited to, 24 inches, 27 inches, 65 inches, and the like. The substrate 103 further includes a base on a side of the reflective layer away from the electronic elements 104. The base may include a glass base, a PCB base, a BT base, or the like. When the base is a glass base, the thickness of the glass base includes but is not limited to 0.4 mm, 0.5 mm, 0.7 mm, or the like.

In the above-described embodiments, the optical film 102 includes a diffuser plate. Ends of the first adhesive-dispensed portions 106 of the driving backplate 101 adjacent to the optical film 102 are in contact with the diffuser plate. The diffuser plate is configured to convert a light source from the driving backplate 101 into a surface light source. The optical film 102 further includes a prism sheet, which is on a side of the diffuser plate away from the driving backplate 101 and is configured to converge light entering into the prism sheet to improve front brightness. The optical film 102 further includes a brightness enhancing film, which is on a side of the prism sheet away from the driving backplate 101 and is configured to improve the utilization rate of light emitted by the backlight module 100 to the driving backplate 101. In some embodiments, the optical film 102 further includes a diffuser sheet, which is located between the diffuser plate and the prism sheet and is configured to further soften and diffuse light entering into the diffuser sheet to make light exiting the diffuser sheet more uniform.

In the backlight module 100 according to the embodiment of the present disclosure, the first adhesive-dispensed portions 106 replace the support columns to support the substrate 103 and the optical film 102, thereby reducing the thickness of the backlight module 100 while simplifying the manufacturing process and saving the processing cost.

Figure 8:
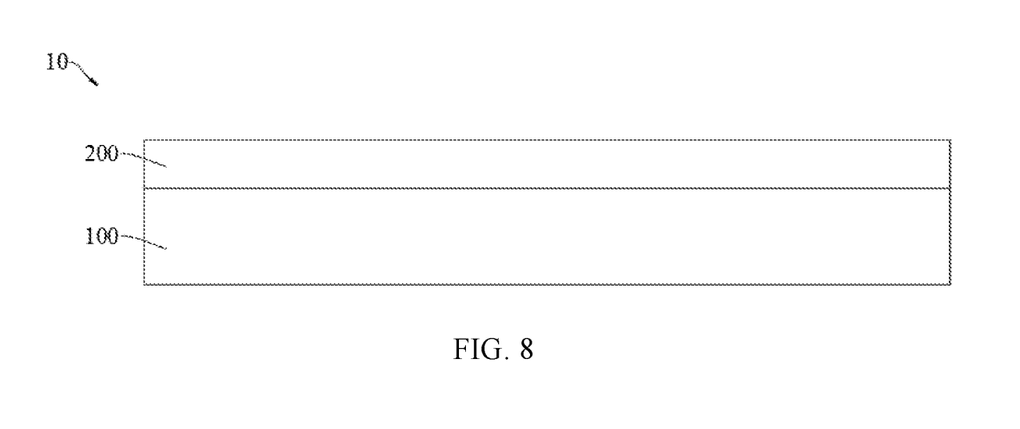
FIG. 8 is a schematic structural diagram of a display device according to an embodiment of the present disclosure.

Referring to FIG. 8, an embodiment of the present disclosure further provides a display device 10 including a backlight module 100 as described above and a display panel 200 on the side of the backlight module 100 light taking-off.

The specific structure of the backlight module 100 can refer to any one of the embodiments of the backlight module 100 and the accompanying drawings, and details are not repeated herein.

The display panel 200 may be a liquid crystal display panel. The display panel 200 includes an array substrate and a color film substrate opposite to each other. The display panel 200 further includes a liquid crystal layer between the array substrate and the array substrate. The display panel 200 further includes a first polarizer on a side of the display panel adjacent to the backlight module 100, and a second polarizer on a side of the display panel 200 away from the backlight module 100.

In the display device 10 according to the embodiment of the present disclosure, the first adhesive-dispensed portions 106 are disposed in the driving backplate 101 of the backlight module 100, and the first adhesive-dispensed portions 106 replace the support columns to support the substrate 103 and the optical film 102, thereby thinning the display device 10, while simplifying the manufacturing process and saving the processing cost.

Embodiments of the present disclosure discloses the backlight module and the display device. The backlight module includes the driving backplate and the optical film on the side of the driving backplate light taking-off. The driving backplate includes the substrate, electronic elements, and the adhesive layer. The electronic elements are disposed on the side of the substrate close to the optical film. The adhesive layer covers the electronic elements and includes first adhesive-dispensed portions. The first adhesive-dispensed portions are in contact with the optical film. When the driving backplate is applied to the backlight module, the first adhesive-dispensed portions can replace the support columns to support the substrate and the optical film, thereby reducing the thickness of the backlight module while simplifying the manufacturing process and saving the processing cost.

Embodiments of the present disclosure illustrate in detail a backlight module and a display device. The principles and embodiments of the present disclosure are explained using exemplary embodiments, and the description of the above embodiment is merely provided to assist in understanding the method of the present disclosure and its core idea. For those skilled in the art, the exemplary embodiments and application scope of the present disclosure can be changed based on the ideas of the present disclosure. In summary, the contents of this specification should not be construed as a limitation of the present disclosure.

According to the present disclosure, when the driving backplate is applied to the backlight module, the first adhesive-dispensed portions in the driving backplate replace the support columns to support the substrate and the optical film, so that the thickness of the backlight module is reduced, the manufacturing process is simplified, and the processing cost is saved.

What is claimed is:

1. A backlight module comprising:
a driving backplate; and
an optical film disposed on a side of the driving backplate light taking-off,
wherein the driving backplate comprises a substrate, a plurality of electronic elements and an adhesive layer,
the plurality of electronic elements are disposed on a side of the substrate close to the optical film, and
the adhesive layer is disposed on the plurality of electronic elements, the adhesive layer comprises a plurality of first adhesive-dispensed portions arranged at intervals, the plurality of first adhesive-dispensed portions contact and support the optical film, and at least one edge of a support region formed by every four adjacent ones of the plurality of first adhesive-dispensed portions is at an angle with a row direction or a column direction of the plurality of electronic elements.

2. The backlight module according to claim 1, wherein the support region comprises a first diagonal and a second diagonal, the first diagonal intersecting the second diagonal;
wherein an extension direction of the first diagonal is parallel to the row direction of the plurality of electronic elements, and/or
an extension direction of the second diagonal is parallel to the column direction of the plurality of electronic elements.

3. The backlight module according to claim 1, wherein a material of the plurality of first adhesive-dispensed portions comprises titanium dioxide, and a mass fraction of titanium dioxide is greater than or equal to 30% and less than or equal to 45% of the total mass of the plurality of first adhesive-dispensed portions.

4. The backlight module according to claim 1, wherein each of the plurality of first adhesive-dispensed portions comprises a first surface in contact with the substrate, and a ratio of a thickness of each of the first adhesive-dispensed portions to a maximum width of the first surface is greater than or equal to 1:1 and less than or equal to 4:1.

5. The backlight module according to claim 1, wherein a reflective layer is disposed on a side of the substrate close to the plurality of electronic elements, and a reflectivity of the plurality of first adhesive-dispensed portions is greater than or equal to 70% and less than or equal to 90% of a reflectivity of the reflective layer.

6. The backlight module according to claim 1, wherein the adhesive layer further comprises a plurality of second adhesive-dispensed portions that are spaced from the plurality of first adhesive-dispensed portions, and a thickness of the plurality of second adhesive-dispensed portions is less than a thickness of the plurality of first adhesive-dispensed portions.

7. The backlight module according to claim 6, wherein the plurality of second adhesive-dispensed portions are spaced apart from the optical film.

8. The backlight module according to claim 7, wherein materials of the plurality of first adhesive-dispensed portions and the plurality of second adhesive-dispensed portions comprise epoxy resin or silicone resin.

9. The backlight module according to claim 1, wherein the optical film comprises a diffuser plate, and the plurality of first adhesive-dispensed portions are in contact with the diffuser plate.

10. A display device, comprising a backlight module and a display panel on a side of the backlight module light taking-off, wherein the backlight module comprises:
a driving backplate; and
an optical film disposed on a side of the driving backplate light taking-off,
wherein the driving backplate comprises a substrate, a plurality of electronic elements and an adhesive layer,
the plurality of electronic elements are disposed on a side of the substrate close to the optical film, and
the adhesive layer is disposed on the plurality of electronic elements, the adhesive layer comprises a plurality of first adhesive-dispensed portions arranged at intervals, the plurality of first adhesive-dispensed portions contact and support the optical film, and at least one edge of a support region formed by every four adjacent ones of the plurality of first adhesive-dispensed portions is at an angle with a row direction or a column direction of the plurality of electronic elements.

11. The display device according to claim 10, wherein the support region comprises a first diagonal and a second diagonal, the first diagonal intersecting the second diagonal;
wherein an extension direction of the first diagonal is parallel to the row direction of the plurality of electronic elements, and/or
an extension direction of the second diagonal is parallel to the column direction of the plurality of electronic elements.

12. The display device according to claim 10, wherein a material of the plurality of first adhesive-dispensed portions comprises titanium dioxide, and a mass fraction of titanium dioxide is greater than or equal to 30% and less than or equal to 45% of the total mass of the plurality of first adhesive-dispensed portions.

13. The display device according to claim 10, wherein each of the plurality of first adhesive-dispensed portions comprises a first surface in contact with the substrate, and a ratio of a thickness of each of the first adhesive-dispensed portions to a maximum width of the first surface is greater than or equal to 1:1 and less than or equal to 4:1.

14. The display device according to claim 10, wherein a reflective layer is disposed on a side of the substrate close to the plurality of electronic elements, and a reflectivity of the plurality of first adhesive-dispensed portions is greater than or equal to 70% and less than or equal to 90% of a reflectivity of the reflective layer.

15. The display device according to claim 10, wherein the adhesive layer further comprises a plurality of second adhesive-dispensed portions that are spaced from the plurality of first adhesive-dispensed portions, and a thickness of the plurality of second adhesive-dispensed portions is less than a thickness of the plurality of first adhesive-dispensed portions.

16. The display device according to claim 15, wherein the plurality of second adhesive-dispensed portions are spaced apart from the optical film.

17. The display device according to claim 16, wherein materials of the plurality of first adhesive-dispensed portions and the plurality of second adhesive-dispensed portions comprise epoxy resin or silicone resin.

18. The display device according to claim 10, wherein the optical film comprises a diffuser plate, and the plurality of first adhesive-dispensed portions are in contact with the diffuser plate.

* * * * *